United States Patent
Yasui et al.

(10) Patent No.: US 11,541,908 B2
(45) Date of Patent: Jan. 3, 2023

(54) INFORMATION PROCESSING SYSTEM, INFORMATION PROCESSING METHOD, AND STORAGE MEDIUM

(71) Applicant: HONDA MOTOR CO., LTD., Tokyo (JP)

(72) Inventors: Yuji Yasui, Wako (JP); Kentaro Ishisaka, Wako (JP); Nobuyuki Watanabe, Wako (JP); Kovi Ahego, Wako (JP); Christopher Lang, Wako (JP); Liyan Liu, Tokyo (JP); Yo Ito, Tokyo (JP); Hirotaka Uchitomi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 350 days.

(21) Appl. No.: 16/620,906

(22) PCT Filed: Jun. 15, 2018

(86) PCT No.: PCT/JP2018/022838
§ 371 (c)(1),
(2) Date: Dec. 10, 2019

(87) PCT Pub. No.: WO2018/230684
PCT Pub. Date: Dec. 20, 2018

(65) Prior Publication Data
US 2020/0164899 A1    May 28, 2020

(30) Foreign Application Priority Data

Jun. 16, 2017 (JP) .............................. JP2017-118697

(51) Int. Cl.
*G01C 22/00* (2006.01)
*G05D 1/00* (2006.01)
(Continued)

(52) U.S. Cl.
CPC ... *B60W 60/00253* (2020.02); *B60H 1/00878* (2013.01); *B60R 25/01* (2013.01);
(Continued)

(58) Field of Classification Search
CPC ......... B60W 60/00253; B60H 1/00878; B60R 25/01; B60R 25/24; G05D 1/0088;
(Continued)

(56) References Cited

U.S. PATENT DOCUMENTS

2002/0052751 A1 * 5/2002 Ebata ............... G06Q 10/08355
705/417

FOREIGN PATENT DOCUMENTS

JP        02-164988        6/1990
JP        H02164988 A *    6/1990
(Continued)

OTHER PUBLICATIONS

English Translation for JP2014089153A (Year: 2022).*
(Continued)

*Primary Examiner* — Mahmoud S Ismail
(74) *Attorney, Agent, or Firm* — Amin, Turocy & Watson, LLP

(57) ABSTRACT

An information processing system includes an acquirer configured to acquire a boarding request, a deriver configured to derive, when an action schedule of an automatic driving vehicle includes a standby state based on a boarding request acquired by the acquirer, a usage charge of the automatic driving vehicle reflecting a cost generated in a traveling state in which the automatic driving vehicle carries a user and travels and a cost generated in the standby state, and an output configured to output information including the usage charge derived by the deriver.

16 Claims, 13 Drawing Sheets

(51) Int. Cl.
*B60W 60/00* (2020.01)
*B60H 1/00* (2006.01)
*B60R 25/01* (2013.01)
*B60R 25/24* (2013.01)
*G01C 21/34* (2006.01)
*G06Q 10/04* (2012.01)
*G06Q 30/02* (2012.01)
*G06Q 50/30* (2012.01)

(52) U.S. Cl.
CPC .......... *B60R 25/24* (2013.01); *G01C 21/3453* (2013.01); *G05D 1/0088* (2013.01); *G06Q 10/047* (2013.01); *G06Q 30/0284* (2013.01); *G06Q 50/30* (2013.01); *G05D 2201/0213* (2013.01); *G06Q 2240/00* (2013.01)

(58) Field of Classification Search
CPC ......... G05D 2201/0213; G06Q 10/047; G06Q 30/0284; G06Q 50/30; G06Q 2240/00
USPC .......................................................... 701/27
See application file for complete search history.

(56) References Cited

FOREIGN PATENT DOCUMENTS

| | | |
|---|---|---|
| JP | 11-165527 | 6/1999 |
| JP | 2001-331894 | 11/2001 |
| JP | 2002-257567 | 9/2002 |
| JP | 2003-058989 | 2/2003 |
| JP | 2007-032134 | 2/2007 |
| JP | 2007032134 A * | 2/2007 |
| JP | 2012-048563 | 3/2012 |
| JP | 2012048563 A * | 3/2012 |
| JP | 2014-089153 | 5/2014 |
| JP | 2014089153 A * | 5/2014 |

OTHER PUBLICATIONS

English Translation for JPH02164988A (Year: 2022).*
English Translation for JP2012048563A (Year: 2022).*
English Translation for JP2007032134A (Year: 2022).*
International Search Report and Written Opinion for International Application Serial No. PCT/JP2018/022838 dated Sep. 11, 2018, 10 pages.

* cited by examiner

FIG. 4

| | | |
|---|---|---|
| DEPARTURE LOCATION | TOKYO OO TOWER | SCHEDULED DEPARTURE TIME | 00:00 |
| FIRST STOPOVER | ASAKUSA | SCHEDULED STAY TIME | 2 HOURS 00 MINUTES |
| SECOND STOPOVER | GINZA | SCHEDULED STAY TIME | 3 HOURS 00 MINUTES |
| DESTINATION | OO HOTEL | | |

INFORMATION PROCESSING SYSTEM, INFORMATION PROCESSING METHOD, AND STORAGE MEDIUM

TECHNICAL FIELD

The present invention relates to an information processing system, an information processing method, and a program.

Priority is claimed on Japanese Patent Application No. 2017-118697, filed Jun. 16, 2017, the content of which is incorporated herein by reference.

BACKGROUND ART

An automatic driving control device which causes an automatic driving vehicle to wait at a next use scheduled location on the basis of schedule information input by a user has been proposed (refer to Patent Literature 1).

CITATION LIST

Patent Literature

[Patent Literature 1]
Japanese Unexamined Patent Application, First Publication No. 2012-48563

SUMMARY OF INVENTION

Technical Problem

Here, a case in which a rental service of an automatic driving vehicle is provided will be considered. In such a case, when a user stops at another location (a stopover) between a departure location and a destination, the user may have difficulty determining whether it is better to keep using the vehicle he or she has been using or to return the vehicle he or she has been using upon arriving at the stopover and transfer to another vehicle when departing from the stopover. For this reason, there is room for improvement in convenience.

The present invention has been made in view of such circumstances, and an object thereof is to provide an information processing system, an information processing method, and a program that can improve convenience.

Solution to Problem

A vehicle control system, a vehicle control method, and a program according to this prevent invention have adopted the following configuration.

(1): According to one aspect of the present invention, an information processing system includes an acquirer configured to acquire a boarding request, a deriver configured to derive, when an action schedule of an automatic driving vehicle includes a standby state based on a boarding request acquired by the acquirer, a first usage charge of the automatic driving vehicle reflecting a cost generated in a traveling state in which the automatic driving vehicle carries a user and travels and a cost generated in the standby state, and an output configured to output information including the first usage charge derived by the deriver.

(2): In the information processing system of the aspect (1), the acquirer acquires information related to an estimated stay time of the user at a stopover between a departure location and a destination, and the deriver derives at least the cost generated in the standby state on the basis of the estimated stay time of the user at the stopover acquired by the acquirer.

(3): In the information processing system of the aspect (2), the deriver generates an action plan of the automatic driving vehicle in the standby state on the basis of the estimated stay time of the user at the stopover between the departure location and the destination, and derives the cost generated in the standby state on the basis of the generated action plan.

(4): In the information processing system of the aspect (3), the deriver searches for at least a parking-available location satisfying a predetermined condition based on the estimated stay time of the user at the stopover between the departure location and the destination and map information indicating parking-available locations in the vicinity of the drip-in location, and derives the first usage charge reflecting a cost generated by using the parking-available location when the parking-available location satisfying the predetermined condition is a paid location.

(5): In the information processing system of the aspect (4), the deriver generates an action plan in which the automatic driving vehicle keeps traveling in an unmanned state when no parking-available locations satisfying the predetermined condition are detected.

(6): In the information processing system of the aspect (5), the deriver derives the first usage charge on the basis of a third usage charge generated by using the parking-available location at the time of traveling in the unmanned state.

(7): In the information processing system of the aspect (5) or (6), the standby state includes traveling in the unmanned state, and the deriver generates, on the basis of the estimated stay time and an additional request for adding a stopover indicated by the boarding request acquired by the acquirer, an action plan of the automatic driving vehicle that moves in the unmanned state to a stopover indicated by the additional request, and derives a cost generated in the standby state on the basis of the generated action plan.

(8): The information processing system of any one of the aspects (1) to (7) further includes an operation receptor configured to receives an operation of the user, and a transmitter configured to transmit at least one of a locking signal that locks a compartment of the automatic driving vehicle from outside of the automatic driving vehicle, an unlocking signal that unlocks the compartment, and an air conditioning control signal that controls air conditioning of the automatic driving vehicle to the automatic driving vehicle based on an operation of the user received by the operation receptor in the standby state.

(9): In the information processing system of any one of the aspects (1) to (5), the deriver derives a second usage charge when transferring to another automatic driving vehicle at the stopover, and the output outputs information including the second usage charge derived by the deriver.

(10): In the information processing system of the aspect (9), the output outputs a condition of the boarding request when the first usage charge calculated by the deriver is lower than the second usage charge.

(11): According to another aspect of the present invention, an information processing system includes an acquirer configured to acquire a boarding request including an estimated stay time at a stopover between a departure location and a destination, a deriver configured to derive a first usage charge when an automatic driving vehicle is occupied from the departure location to the destination and a second usage charge when transferring to another automatic driving vehicle at the stopover on the basis of the boarding request acquired by the acquirer, and an output configured to output information including the first usage charge and the second usage charge derived by the deriver.

(12): In the information processing system of the aspect (3), when the action plan includes a standby state starting from the stopover, the deriver generates a plurality of action plans which can be taken by the automatic driving vehicle in the standby state and derives a cost generated in an action plan for each of the action plans, and the output outputs information further including a cost for each of the action plans derived by the deriver.

(13): In the information processing system of the aspect (12), the plurality of action plans which can be taken by the automatic driving vehicle include a plan in which a plurality of different vehicles move through different routes, and at least one vehicle joins a user and is boarded again.

(14): In the information processing system of any one of the aspects (1) to (13), the acquirer is capable of acquiring a change request indicating a change in the boarding request while the automatic driving vehicle is traveling based on the boarding request, and the deriver derives a difference in amount from the first usage charge that is caused by a change from the boarding request on the basis of the change request acquired by the acquirer.

(15): In the information processing system of any one of the aspects (1) to (14), the deriver derives the first usage charge further on the basis of a usage status of the automatic driving vehicle.

(16): According to still another aspect of the present invention, an information processing method includes, by a computer, acquiring a boarding request, deriving a usage charge of an automatic driving vehicle reflecting a cost generated in a traveling state in which the automatic driving vehicle carries a user and travels and a cost generated in the standby state based on the acquired boarding request, and outputting information including the derived usage charge.

(17): According to still another aspect of the present invention, a program causes a computer to acquire a boarding request, to derive a usage charge of an automatic driving vehicle reflecting a cost generated in a traveling state in which the automatic driving vehicle carries a user and travels and a cost generated in the standby state based on the boarding request, and to output information including the derived usage charge.

Advantageous Effects of Invention

According to the aspects (1), (16), and (17), a user can know the usage charge when a vehicle that has been used up to a stopover is continuously used, and it is possible to improve the convenience.

According to the aspect (2), a user can know the usage charge reflecting the cost in accordance with the length of the estimated stay time at a stopover. For this reason, it is possible to further improve the convenience.

According to the aspect (3), to user can know the usage charge reflecting the action plan of an automatic driving vehicle in accordance with the length of the estimated stay time at a stopover. For this reason, it is possible to further improve the convenience.

According to the aspect (4), a user can know the usage charge reflecting the cost generated by using a parking-available location when the parking-available location is a paid one. For this reason, it is possible to further improve the convenience.

According to the aspect (5), when a parking-available location satisfying a predetermined condition is not detected, a user can know the usage charge reflecting an action plan in which the automatic driving vehicle keeps traveling in the unmanned state. For this reason, it is possible to further improve the convenience.

According to the aspects (9) and (11), a user can easily compare the usage charge when the automatic driving vehicle that has been used up to a stopover is continuously used as it is with the usage charge when transferring to another automatic driving vehicle at a stopover. For this reason, it is possible to further improve the convenience.

According to the aspect (10), when the estimated stay time at a stopover is shorter than a predetermined time, a user can know that it is relatively cheaper to keep using the automatic driving vehicle which has been used until there. For this reason, it is possible to further improve the convenience.

BRIEF DESCRIPTION OF DRAWINGS

FIG. 4 is a diagram which shows an example of an input screen displayed on a terminal device 100.

DESCRIPTION OF EMBODIMENTS

Hereinafter, embodiments of an information processing system, an information processing method, and a program of the present invention will be described with reference to the drawings. The information processing system is, for example, a device for presenting a usage charge when an automatic driving vehicle is occupied for an arbitrary certain period to a user who wants to use a paid rental service of an automatic driving vehicle (for example, a use like a sightseeing taxi which has a standby state occurring during an occupation period). Furthermore, the information processing system of the present embodiment is a device for presenting a comparison between a usage charge when the automatic driving vehicle is occupied for a certain period and a usage charge when transferring to another automatic driving vehicle at a stopover between a departure location and a destination to a user.

Here, the "automatic driving vehicle" in the present application is, for example, an automatic driving vehicle which basically does not require a driving operation. In addition, "based on XX" in the present application means "based on at least XX," and includes a case based on another element in addition to XX. Moreover, "based on XX" is not limited to a case in which XX is directly used, but includes a case based on calculated or processed XX. "XX" is an arbitrary element (for example, arbitrary information).

[Overall Configuration]

Figure 1:
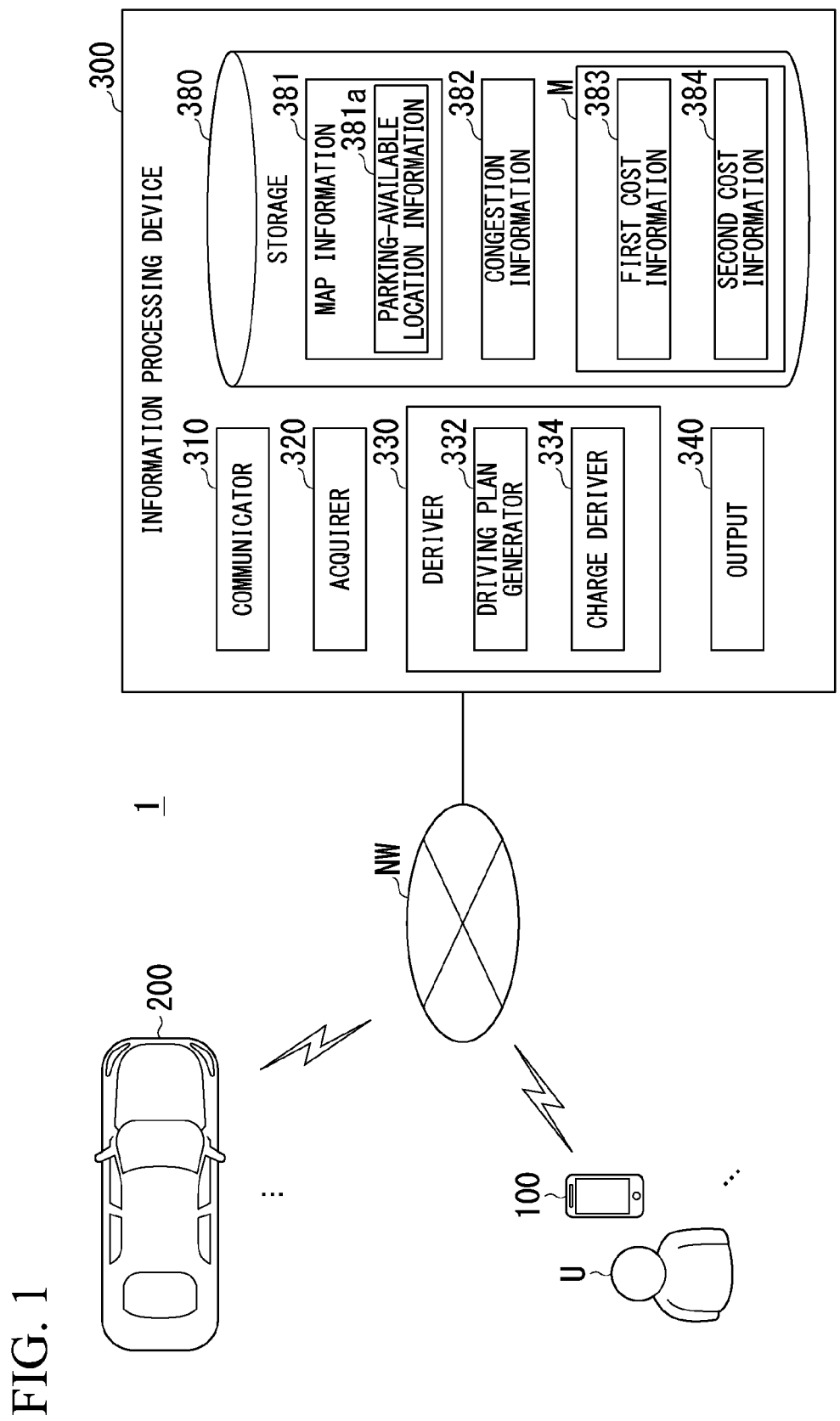
FIG. 1 is a configuration diagram which shows an entire vehicle allocation support system 1 including an information processing device 300.

FIG. 1 is a configuration diagram which shows an entirety of a vehicle allocation support system 1 including the information processing device 300. The vehicle allocation support system 1 includes one or more terminal devices 100 used by one or more users U, one or more (for example, a plurality of) automatic driving vehicles 200 (hereinafter, simply referred to as "vehicle 200"), and the information processing device 300. These components can communicate with one another via a network NW. The network NW includes the Internet, a wide area network (WAN), a local area network (LAN), a public line, a provider device, a dedicated line, a wireless base station, and the like. Note that "being used by the user U" may include a case in which a terminal device which can be used by a number of unspecified users such as a terminal device of an Internet café being temporarily used by the user U.

[Terminal Device]

The terminal device 100 is, for example, a smartphone, a tablet terminal, a personal computer, or the like. In the terminal device 100, an application program for using a rental service of a vehicle 200, a browser, or the like is started to support a service to be described below. In the following description, it is assumed that the terminal device 100 is a smartphone and an application program (vehicle allocation support application) is started. The vehicle allocation support application communicates with the information processing device 300 in accordance with an operation of the user U, and transmits a boarding request of the user U to the information processing device 300 or generates information caused to be displayed on a display screen of the terminal device 100 based on information received from the information processing device 300.

[Vehicle]

Figure 2:
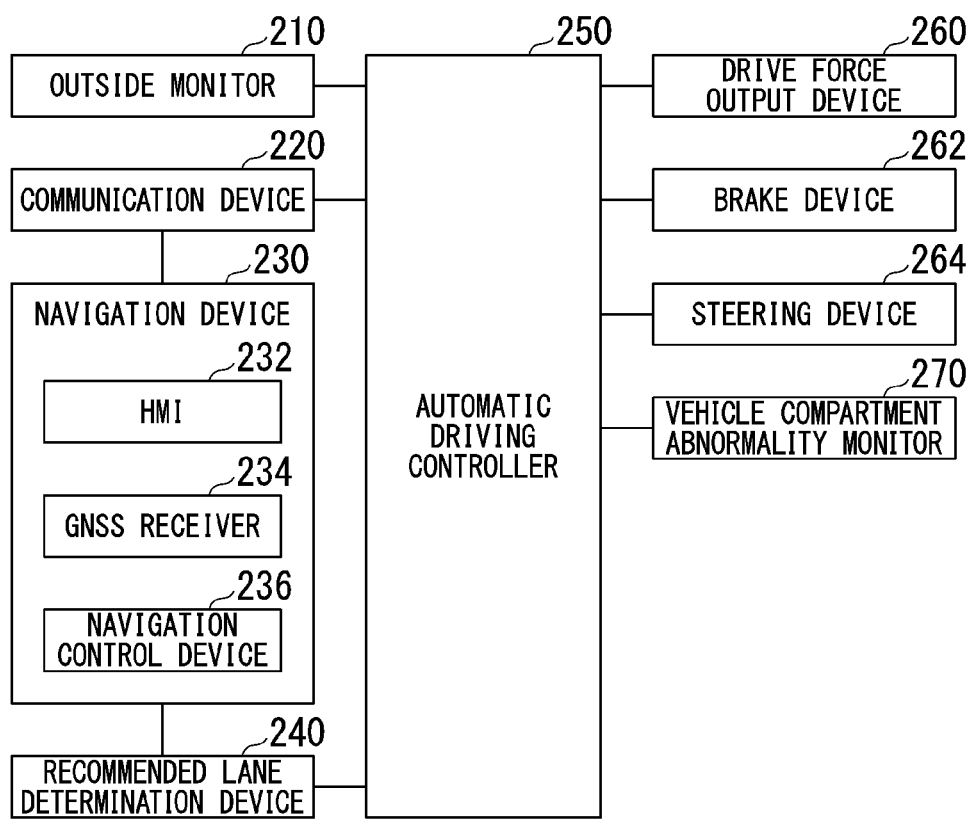
FIG. 2 is a configuration diagram which shows an example of a vehicle 200.

The vehicle 200 is, for example, a vehicle having four or more wheels, but may be a motorcycle or other vehicles. FIG. 2 is a configuration diagram which shows an example of the vehicle 200. The vehicle 200 includes, for example, an outside monitor 210, a communication device 220, a navigation device 230, a recommended lane determination device 240, an automatic driving controller 250, a drive force output device 260, a brake device 262, a steering device 264, a vehicle compartment abnormality monitor 270. Note that the vehicle 200 may be referred to as a "host vehicle 200" in the following description.

The outside monitor 210 includes, for example, a camera, radar, light detection and ranging (LIDAR), an object recognition device that performs sensor fusion processing on the basis of outputs of these, and the like. The outside monitor 210 estimates a type of an object (particularly, vehicles, pedestrians, and bicycles) existing in the vicinity of the vehicle 200, and outputs the estimated type of an object and information on the position and the speed thereof to the automatic driving controller 250.

The communication device 220 is, for example, a wireless communication module for connecting to the network NW or directly communicating with other vehicle, terminal devices of pedestrians, and the like. The communication device 220 performs wireless communication on the basis of Wi-Fi, dedicated short range communications (DSRC), Bluetooth (registered trademark), or other communication standards. A plurality of communication devices in accordance with an application may also be prepared as the communication device 220.

The navigation device 230 includes, for example, a human machine interface (HMI) 232, a global navigation satellite system (GNSS) receiver 234, and a navigation control device 236. The HMI 232 includes, for example, a touch panel display device, a speaker, a microphone, and the like. The GNSS receiver 234 measures a position of a host vehicle (the position of the vehicle 200) on the basis of radio waves coming from a GNSS satellite (for example, a GPS satellite). The navigation control device 236 includes, for example, a central processing unit (CPU) and various storage devices, and controls an entirety of the navigation device 230. The storage devices store map information (navigation map). The navigation map is a map that expresses a road with nodes and links. The navigation control device 236 determines a route from the position of the vehicle 200 measured by the GNSS receiver 234 to a destination designated using the HMI 232 with reference to a navigation map. In addition, the navigation control device 236 may transmit the position of the vehicle 200 and the destination to a navigation server (not shown) using the communication device 220, and acquire a route returned from the navigation server. In the present embodiment, the navigation control device 236 may identify the route to the destination by receiving an action plan including a route of the host vehicle 200 derived by an information processing device 300 to be described below from the information processing device 300. The navigation control device 236 outputs information on a route determined or identified in any of the methods described above to the recommended lane determination device 240.

The recommended lane determination device 240 includes, for example, a micro processing unit (MPU) and various storage devices. The storage devices store map information with high accuracy which is more detailed than the navigation map. The map information with high accuracy includes, for example, information such as a road width, a slope, a curvature, and a signal position for each lane. The recommended lane determination device 240 determines a recommended lane preferred for traveling in along a route input from the navigation device 230 and outputs the recommended lane to the automatic driving controller 250.

The automatic driving controller 250 includes one or more processors such as a CPU and a MPU and various storage devices. In principle, the automatic driving controller 250 causes the vehicle 200 to travel a recommended lane determined by the recommended lane determination device 240, and causes the vehicle 200 to automatically travel so as to avoid contact with an object whose position and speed are input from the outside monitor 210. The automatic driving controller 250 sequentially executes, for example, various events. The events include a constant speed traveling event in which a vehicle travels the same traveling lane at a constant speed, a following traveling event in which a vehicle follows a preceding vehicle, a lane change event, a join event, a branch event, an emergency stop event, a tollgate event for passing through a tollgate, a handover event for ending automatic driving and switching to a manual driving, and the like. In addition, actions for avoidance may be planned on the basis of surrounding conditions (presence of surrounding vehicles and pedestrians, land narrowing due to road construction, and the like) of the vehicle 200 while these events are executed.

The automatic driving controller 250 generates a target trajectory which the vehicle 200 travels in the future. The target trajectory includes, for example, a speed element. For example, the target trajectory is expressed as a sequential arrangement of points (trajectory points) that the host vehicle 200 needs to reach. The trajectory points are points that the host vehicle 200 needs to reach for each predetermined traveling distance, and apart from this, a target speed and a target acceleration for each predetermined sampling time (for example, about several tenths of [sec]) are generated as a part of the target trajectory. In addition, the trajectory points may be positions that the host vehicle 200 needs to reach at a corresponding sampling time for each predetermined sampling time. In this case, information on the target speed and the target acceleration is expressed at intervals between the trajectory points.

Figure 3:
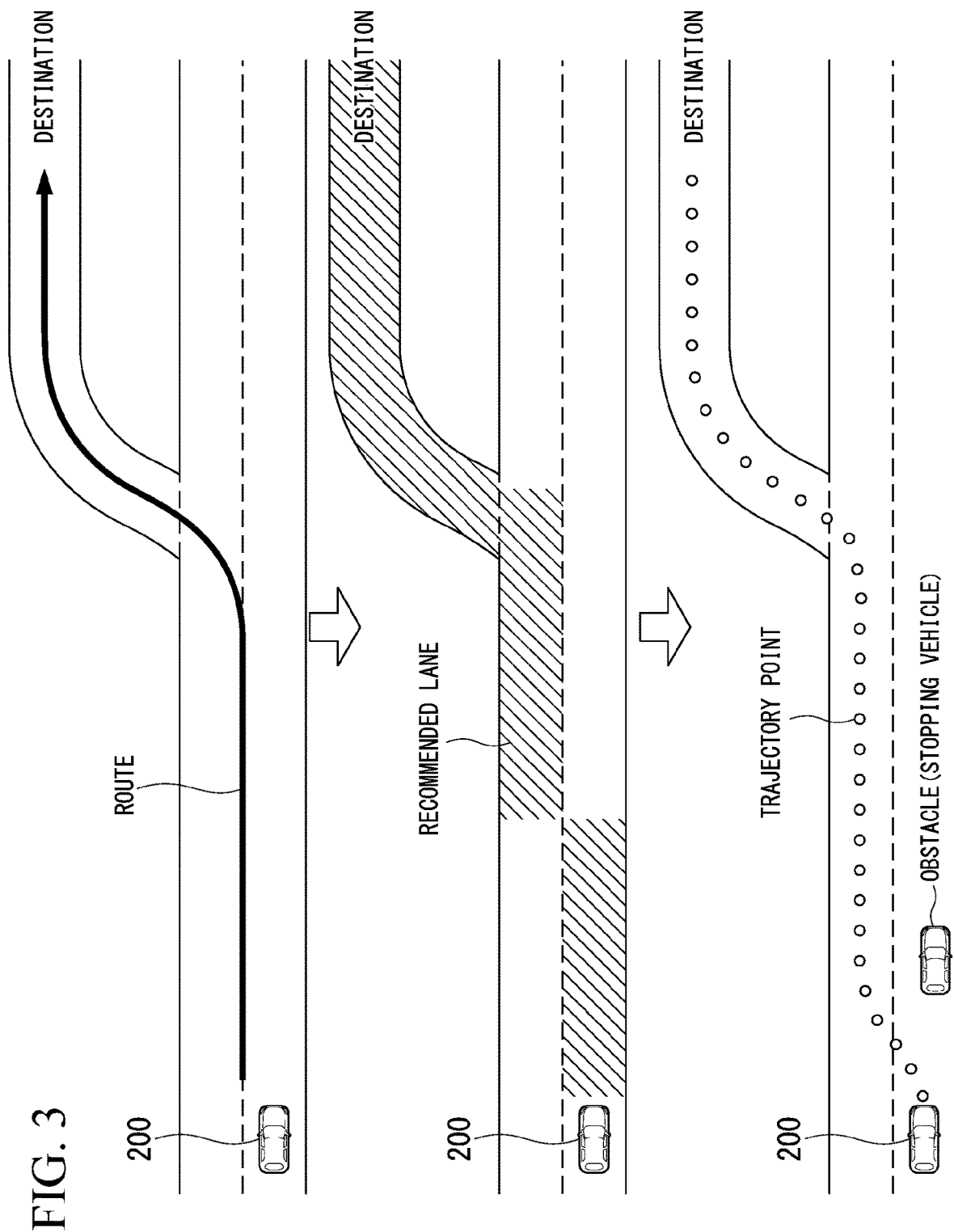
FIG. 3 is a diagram for describing a processing procedure of automatic driving.

FIG. 3 is a diagram for describing a processing procedure of automatic driving. First, as shown in the upper diagram, the navigation device 230 determines or identifies a route. This route is, for example, a rough route with no distinction between lanes. Next, as shown in the middle diagram, the recommended lane determination device 240 determines a recommended lane that is easy to travel in along the route. Then, as shown in the lower diagram, the automatic driving controller 250 generates trajectory points to travel in along the recommended lane as much as possible while avoiding obstacles and the like, and controls some or all of the drive force output device 260, the brake device 262, and the steering device 264 to travel in along the trajectory points (and an accompanying speed profile). Note that such division of roles is merely an example, and, for example, the automatic driving controller 250 may perform the processing in an integrated manner.

In the present embodiment, the automatic driving controller 250 can cause the vehicle 200 to transit to the standby state. A "wait mode" is a mode in which the vehicle 200 waits at a predetermined location (or an evacuation location) for a certain period of time and returns to the user U in accordance with a call from the user (for example, a call from the terminal device 100 through the network NW). For example, when the automatic driving controller 250 has received a call from the terminal device 100 in a parked state, it generates an action plan for causing the vehicle 200 to move toward a position of the terminal device 100 included in the call from the terminal device 100 or a position designated in the call from the terminal device 100 and causes the vehicle 200 to move to the user U. In the present embodiment, the vehicle 200 waits in the wait mode when it enters the standby state to be described below.

The drive force output device 260 outputs a traveling drive force (torque) for traveling of the vehicle 200 to a drive wheel. The drive force output device 260 includes, for example, a combination of an internal combustion engine, an electric motor, a transmission, and the like, and a power ECU that controls them. The power ECU controls the constituents described above in accordance with information input from the automatic driving controller 250 or information input from a driving operator (not shown).

The brake device 262 includes, for example, a brake caliper, a cylinder that transmits hydraulic pressure to the brake caliper, an electric motor that generates hydraulic pressure in the cylinder, and a brake ECU. The brake ECU controls the electric motor in accordance with the information input from the automatic driving controller 250 or the information input from a driving operator such that brake torque corresponding to a braking operation is output to each wheel. The brake device 262 may include a mechanism that transmits hydraulic pressure generated by an operation of a brake pedal included in the driving operator to the cylinder via a master cylinder as a backup. Note that the brake device 262 is not limited to the constitution described above, and may be an electronically controlled hydraulic pressure brake device that controls an actuator according to the information input from the automatic driving controller 250 and transmits a hydraulic pressure of the master cylinder to the cylinder.

The steering device 264 includes, for example, a steering ECU and an electric motor. The electric motor changes, for example, a direction of a steering wheel by applying a force to a rack and pinion mechanism. The steering ECU drives the electric motor according to the information input from the automatic driving controller 250 or the information input from a driving operator, and changes the direction of the steering wheel.

The vehicle compartment abnormality monitor 270 includes, for example, a camera in a vehicle compartment which can photograph an inside of the vehicle compartment of the host vehicle 200, and a detector which detects an abnormality in the vehicle compartment on the basis of an image photographed by the camera in the vehicle compartment. The vehicle compartment abnormality monitor 270 monitors, for example, luggage of the user U or the like remaining in the vehicle compartment in the standby state of the vehicle 200 to be described below. The vehicle compartment abnormality monitor 270 determines an abnormality in the vehicle compartment based on a predetermined condition. When the vehicle compartment abnormality monitor 270 has determined that an abnormality has occurred in the vehicle compartment, it may transmit an alarm to the terminal device 100 of the user U via the communication device 220 and the network NW.

[Information Processing Device]

Returning to FIG. 1, the information processing device 300 will be described. The information processing device 300 is an example of the "information processing system," and is, for example, a server device provided in a data center or the like. The information processing device 300 receives a boarding request from the user U, outputs information for presenting a usage charge of the vehicle 200 in accordance with content (boarding conditions) of the boarding request to the user, and arranges the vehicle 200 when the user applies for use of the vehicle 200. The information processing device 300 includes, for example, a communicator 310, an acquirer 320, a deriver 330, an output 340, and a storage 380.

The communicator 310 is, for example, a network card for connecting to the network NW. In addition, the storage 380 is realized by a hard disk drive (HDD), a flash memory, a random access memory (RAM), a read only memory (ROM), or the like. The communicator 310 communicates with the terminal device 100 or the vehicle 200 via the network NW.

The storage 380 stores map information 381, congestion information 382, first cost information 383, and second cost information 384 in advance. The map information 381 is a map that expresses a road using nodes and links, and is the same information as map information (a navigation map) referred to by the navigation device 230 of the vehicle 200.

In the present embodiment, the map information 381 includes parking-available location information 381a indicating a location in which the vehicle 200 can park. The parking-available location information 381a includes, for example, position information of free and paid parking lots, and in the case of a paid parking lot, charge information thereof, information indicating whether billing and payment (billing and payment itself may be done at a later date) of a parking lot charge can be performed on the unmanned vehicle 200 which is in automatic driving at each parking lot, and the like. The congestion information 382 is information indicating an average congestion status of each road at each date and time throughout the year. Note that the congestion information 382 may include average congestion information for each date and time throughout the year of each parking-available location included in the parking-available location information 381a. The first cost information 383 is various types of information used for cost calculation in the case of exclusive use to be described below. The second cost information 384 is various types of information used for cost calculation in the case of transfer use to be described below. Note that the first cost information 383 and the second cost information 384 will be described below.

The acquirer 320, the deriver 330, and the output 340 are realized by a processor such as a CPU executing a program (software) stored in the storage 380. In addition, some or all of these functional units may be realized by hardware such as a large scale integration (LSI), an application specific integrated circuit (ASIC), a field-programmable gate array (FPGA), or a graphics processing unit (GPU), and may also be realized by software and hardware in cooperation.

Next, the acquirer 320 will be described. The acquirer 320 acquires a boarding request issued from the terminal device 100 of the user U via the communicator 310 and the network NW. The acquirer 320 can acquire a boarding request which causes a standby state accompanied by traveling in an unmanned state in the automatic driving vehicle 200 at a stopover between a departure location and a destination. Here, the "departure location" is a point at which the user U starts using the vehicle 200. The "destination" is a point at which the user U ends the use of the vehicle 200. Note that the "departure location" and the "destination" may be the same point. The "stopover" is a location at which the vehicle 200 stops on the way from the departure location to the destination, and is, for example, a point at which the user U exits the vehicle 200 and stays for a certain period of time. Note that the "stopover" is not limited to one point, and may be a section in which the user U exits the vehicle 200 and moves on foot or moves using another moving means. In addition, there may be one stopover between the departure location and the destination, or there may be two or more. The stopover may be referred to as a "transit point" or a "visit location."

The "standby state accompanied by traveling in an unmanned state in the automatic driving vehicle" is a standby state accompanied by the vehicle 200 moving by automatic driving (for example, performing an evacuation action toward a parking-available location) between a user exiting the vehicle 200 and entering the vehicle 200 again after the vehicle 200 arrives at a stopover. Note that the "standby state accompanied by traveling in an unmanned state in the automatic driving vehicle" includes both a case in which traveling in the unmanned state occurs at least once before and after parking when the vehicle 200 parks and waits at a parking-available location and a case in which the vehicle waits while it keeps traveling in the unmanned state ("free running" in this application) when a parking-available location is not found. The "unmanned state" includes a case in which the luggage of the user U is loaded on the vehicle 200.

FIG. 4 is a diagram which shows an example of an input screen displayed on the terminal device 100 of the user U using the vehicle allocation support application described above. As shown in FIG. 4, the acquirer 320 acquires, for example, as content of a boarding request, information indicating a departure location, a scheduled departure time from the departure location, one or more stopovers, an estimated stay time at each stopover, and a destination using the vehicle allocation support application described above. Note that the acquirer 320 may acquire more detailed information on a desired exit location and a desired reentry location in each stopover as a part of information on each stopover. The estimated stay time at each stopover is a time for a user to perform a desired action (for example, shopping or eating) at each stopover, and is, for example, several minutes to several hours. However, the estimated stay time is not limited to the example described above. For example, FIG. 4 shows an example of a boarding request for departing from Tokyo XX tower, stopping at Asakusa, then stopping at Ginza, and finally arriving at a XX hotel. Note that the estimated stay time at a stopover is not a required input item. For example, when the estimated stay time is not specified (when there is no input regarding the estimated stay time at a stopover), one of the vehicle allocation support application, the acquirer 320, and the deriver 330 to be described below may predict and set the estimated stay time at a stopover based on attribute information of the user U (a sex, an age, and the like of the user U) acquired for the user U (for example, acquired on the basis of an input of the user U), a status of a stopover (a type, a congestion status, and the like of a stopover), and the estimated stay time corresponding to the attribute of the user U. The "estimated stay time corresponding to the attribute of the user U" is, for example, table information indicating an average stay time for each attribute of the user U (or an average stay time for each combination of the attribute of the user U and the type of a stopover). This table information is, for example, stored in the storage 380 in advance.

Moreover, in the present embodiment, for convenience of description, a case in which the user U issues a boarding request through the terminal device 100 before departing from a departure location will be described as an example. However, a timing at which the user U issues a boarding request (a timing at which the acquirer 320 acquires the boarding request) is not limited to the example described above. The timing at which the user issues a boarding request may be while the user U moves from a departure location to a stopover (while in the vehicle 200) or when the user U arrives at a stopover. In other words, processing of each functional unit of the information processing device 300 to be described below may be executed while the user U moves from a departure location to a stopover or when the user U arrives at a stopover. The boarding request issued when the user U arrives at a stopover may include less information than when a boarding request is issued before departing from a departure location, such as only a stay time at the stopover, or only a stay time at the stopover and a next destination. In addition, the user U may issue a boarding request through the terminal device 100 when the user U enters the vehicle 200 again or changes a schedule. While the user U moves from a departure location to a stopover, when the user arrives at the stopover, when the user U enters the vehicle again, or when a boarding request issued when the user U changes a schedule (which may be referred to as a "new boarding request," a "change request," or an "additional request") is acquired, the information processing device 300 calculates a difference between an initial charge (or a charge calculated on the basis of the content of a boarding request previously issued) and a charge based on the content of a new boarding request, and outputs it. In addition, when a new boarding request is acquired, the information processing device 300 may calculate an action plan and a charge between a departure location and a destination or between a stopover and the destination on the basis of the content of this new boarding request again, and may also present another plan. "Another plan" means, for example, a transfer use plan for an exclusive use plan to be described below or an exclusive use plan for a transfer use plan. However, examples of "another plan" are not limited to the above description and may include another plan from another point of view.

Next, the deriver 330 will be described. As shown in FIG. 1, the deriver 330 includes, for example, a driving plan generator 332 and a charge deriver 334.

Figure 5:
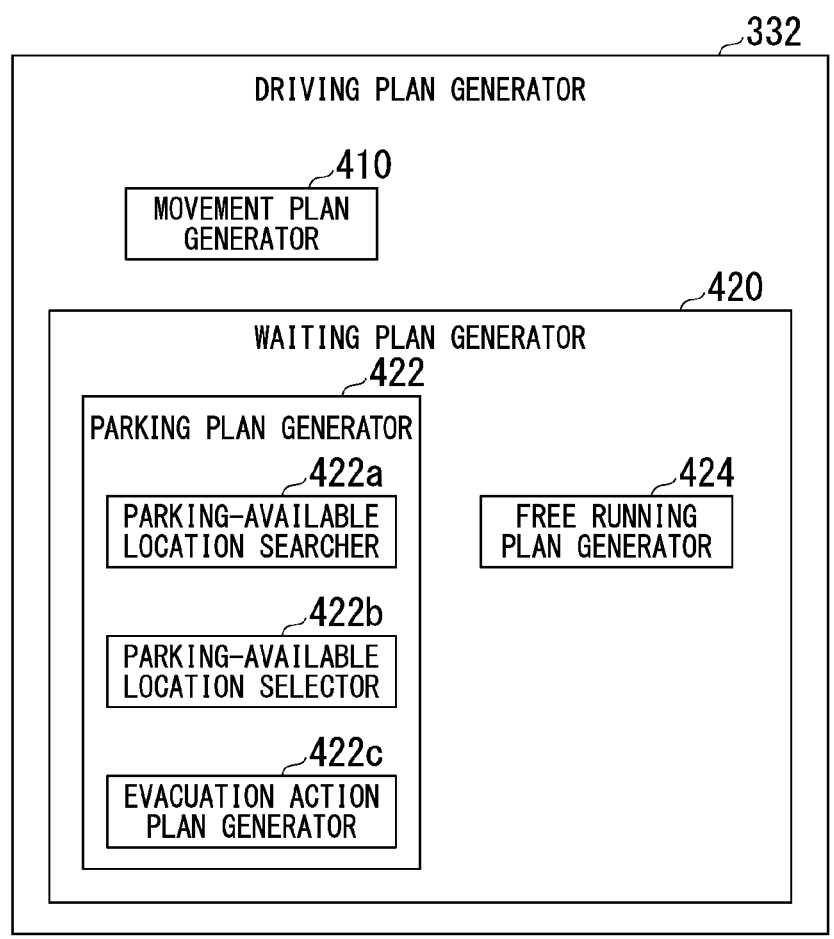
FIG. 5 is a configuration diagram of a driving plan generator 332.

FIG. 5 is a configuration diagram of the driving plan generator 332. The driving plan generator 332 includes, for example, a movement plan generator 410 and a waiting plan generator 420.

The movement plan generator 410 generates, for example, a movement plan (a traveling plan) to go to a destination from a departure location via a stopover based on a boarding request acquired by the acquirer 320, and the map information 381 and the congestion information 382 stored in the storage 380. For example, the movement plan generator 410 derives a shortest route or a shortest time route to go to a destination from a departure location via a stopover. These routes are, for example, rough routes with no distinction between lanes. In addition, the movement plan generator 410 calculates a movement distance of each section (for example, a section between the departure location and a first stopover, a section between a plurality of stopovers, and a section between a last stopover and the destination) of the derived route. Furthermore, the movement plan generator 410 derives a predicted operation time in each section, estimated arrival and departure times at each stopover, and an estimated arrival time at the destination based on the derived route, an estimated departure time from the departure location, an estimated stay time at each stopover, and a prediction model stored in the storage. The movement plan generator 410 outputs information indicating the derived movement distance of each section and information on time such as the derived predicted operation time to the charge deriver 334 and the output 340.

The waiting plan generator 420 determines whether the standby state of the vehicle 200 is included in an action schedule of the vehicle 200 based on a boarding request acquired by the acquirer 320. For example, the waiting plan generator 420 determines that the standby state described above is included when the estimated stay time at each stopover exceeds a certain period of time. The waiting plan generator 420 generates, with respect to stopovers at which the standby state is included, the action plan (waiting plan) of the vehicle 200 from the time the user exits the vehicle 200 at a stopover until the user enters the vehicle 200 again. For example, the waiting plan generator 420 generates the action plan of the vehicle 200 in the standby state based on a length of the estimated stay time at each stopover acquired by the acquirer 320.

The waiting plan generator 420 generates an evacuation action plan for evacuating the vehicle 200 using automatic driving when stopping is permitted but parking is prohibited at a location at which the user exits at a stopover. For example, the waiting plan generator 420 generates the action plan of the vehicle 200 in the standby state based on the estimated stay time of the user U at a stopover and map information stored in the storage 380 (map information indicating parking-available locations in the vicinity of the stopover). In detail, the waiting plan generator 420 includes, for example, a parking plan generator 422 and a free running plan generator 424. The parking plan generator 422 includes, for example, a parking-available location searcher 422a, a parking-available location selector 422b, and an evacuation action plan generator 422c.

The parking-available location searcher 422a searches for one or more parking-available locations satisfying a predetermined condition based on the estimated stay time of a user at a stopover and the map information 381 stored in the storage 380. The "parking-available location satisfying a predetermined condition" is, for example, a parking-available location which is located within a predetermined distance from a stopover (a position at which the user exits or reenters a vehicle). In addition, the "predetermined condition" may include a condition related to a charge at a parking-available location. Moreover, the "predetermined condition" may include that the automatic driving vehicle 200 can enter or exit a parking lot even when it is in the unmanned state, that the billing and payment of a parking lot cost (billing and payment itself may be performed on a later date) are possible even when the automatic driving vehicle 200 is in the unmanned state, and the like. The "parking-available location" is, for example, a free or paid parking lot, but may be a location other than an official parking lot as long as it is legally acceptable and does not interfere with other people. Note that the parking-available location may be actually a rough location based on a premise that the vehicle 200 searches for a parking-available position in a field using the outside monitor 210. The parking-available location searcher 422a outputs one or more parking-available locations satisfying a predetermined condition detected through the search to the parking-available location selector 422b. In addition, when no parking-available locations satisfying a predetermined condition are detected, the parking-available location selector 422a outputs a signal indicating that fact to the free running plan generator 424.

The parking-available location selector 422b selects one parking-available location for parking the vehicle 200 from one or more parking-available locations that satisfy the predetermined condition detected by the parking-available location searcher 422a. For example, the parking-available location selector 422b selects one parking-available location for parking the vehicle 200 based on a predetermined priority among one or more parking-available locations that satisfy the predetermined condition detected by the parking-available location searcher 422a. The "predetermined priority" is, for example, that a distance from an exit position or a reentry position of the user U at a stopover to the parking-available location is the shortest or that the cost of the parking-available location is free or relatively cheap. In addition, the parking-available location selector 422b may add a congestion status equal to or less than a predetermined threshold value to a condition for selecting a parking-available location based on the congestion information 382 indicating a congestion status of a parking-available location. The parking-available location selector 422b outputs the selected parking-available location to the evacuation action plan generator 422c and the charge deriver 334.

The evacuation action plan generator 422c generates an action plan for causing the vehicle 200 to move from the exit position of the user U at a stopover to the parking-available location selected by the parking-available location selector 422b based on the parking-available location selected by the parking-available location selector 422b and the map information 381 stored in the storage 380. In addition, the evacuation action plan generator 422c generates an action plan for causing the vehicle 200 to move from the parking-available location selected by the parking-available location selector 422b to the reentry position of the user U at the stopover. Note that the "action plan" mentioned herein may be, for example, a rough route with no distinction between lanes. The evacuation action plan generator 422c outputs the generated action plan to the charge deriver 334.

The free running plan generator 424 generates an action plan that causes the vehicle 200 to keep traveling in the unmanned state from the time the user U exits the vehicle 200 at a stopover until the user U enters the vehicle 200 again when no parking-available locations satisfying a predetermined condition are detected by the parking-available location searcher 422a. For example, the free running plan generator 424 selects a traveling route having a low congestion status among selectable traveling routes based on the map information 381 and the congestion information 382 stored in the storage 380. In addition, the free running plan generator 424 may select a traveling route that is likely to improve fuel efficiency of the vehicle 200 (for example, a traveling route that has fewer stops or starts) based on the map information 381. The free running plan generator 424 outputs the generated action plan to the charge deriver 334.

Next, returning to FIG. 1, the charge deriver 334 will be described. The charge deriver 334 derives the usage charge of the vehicle 200 based on a driving plan generated by the driving plan generator 332 (including a movement plan generated by the movement plan generator 410 and a waiting plan generated by the waiting plan generator 420). In the present embodiment, the charge deriver 334 derives a first usage charge of a case of having occupied one vehicle 200 from a departure location to a destination (hereinafter, may be referred to as a "case of exclusive use") and a second usage charge of a case of returning the vehicle 200 when a stopover is reached and transferring to another vehicle 200 when departing from the stopover in one or more stopovers between the departure plate to the destination (hereinafter referred to as a "case of transfer use"). Hereinafter, the charge in the case of exclusive use is simply referred to as a "first usage charge." In addition, the charge in the case of transfer use is simply referred to as a "second usage charge."

In the present embodiment, the charge deriver 334 derives the first usage charge that reflects a cost generated in the traveling state in which the vehicle 200 carries a user and travels and a cost generated in the standby state at a stopover. For example, the charge deriver 334 derives the cost generated in the traveling state based on the movement plan generated by the movement plan generator 410. In the present embodiment, the charge deriver 334 derives the cost generated in the traveling state based on a traveling distance of each section, a predicted operation time of each section (an occupation time in the traveling state), and first cost information 383 stored in the storage 380. The cost generated in the traveling state includes, for example, a fuel cost required for traveling of the vehicle 200 and a charge for using a toll road. The first cost information 383 includes information indicating the fuel cost per unit distance and the charge for using a toll road, and information indicating a cost per unit time of the vehicle 200 in the case of exclusive use.

Similarly, the charge deriver 334 derives a cost generated in the standby state based on a waiting plan generated by the waiting plan generator 420. In the present embodiment, the charge deriver 334 derives the cost generated in the standby state based on a cost caused by a behavior (traveling or parking) of the vehicle 200 in the standby state at each stopover, an occupation time (including a traveling time in the unmanned state) in the standby state at each stopover, the first cost information 383 described above, and the map information 381 (charge information of each parking-available location). The cost generated in the standby state includes, for example, the fuel cost required for traveling to a parking-available location and back, the cost generated by using a parking-available location (for example, a parking lot charge), fuel cost accompanied by free running, or the like. The cost generated in the standby state is an example of a "third usage charge." Note that charge information of each parking-available location is included in, for example, the map information 381, but may also be included in the first cost information 383. In addition, the cost generated in the standby state may also include a cost of securing against a risk of an accident accompanied by traveling in the unmanned state.

In addition, the charge deriver 334 derives a second usage charge corresponding to a case in which the user U has transferred to another vehicle 200 at a stopover. For example, the second usage charge is derived on the basis of the same boarding request as the first usage charge. In the present embodiment, the charge deriver 334 derives the second usage charge which reflects the cost generated in the traveling state in which the vehicle 200 carries a user and travels. For example, the charge deriver 334 derives the cost generated in the traveling state based on a movement plan (for example, the same movement plan as in the case of exclusive use) generated by the movement plan generator 410. The cost generated in the traveling state includes, for example, the fuel cost required for the traveling of the vehicle 200, the charge for using a toll road, and the like. The second cost information 384 includes information indicating the fuel cost per unit distance and the charge for using a toll road, and information indicating a cost per unit time of the vehicle 200 in the case of transfer use. Here, the cost per unit time of the vehicle 200 in the case of transfer use is higher than the cost per unit time of the vehicle 200 in the case of exclusive use.

Figure 6:
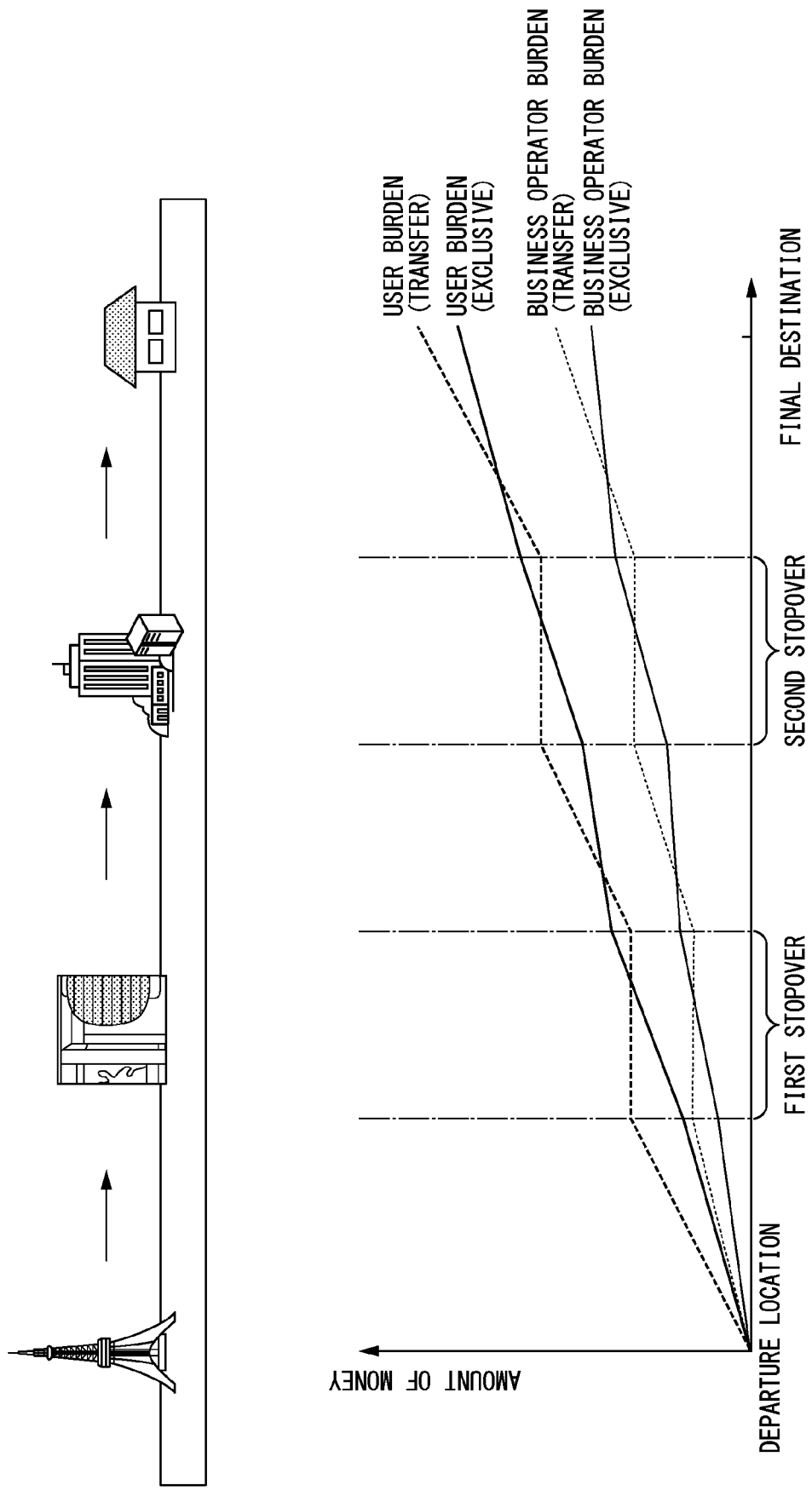
FIG. 6 is a diagram which conceptually shows an example of content of a charge model M.

FIG. 6 is a diagram which conceptually shows an example of content of a charge model M proposed to the user U. In FIG. 6, a "business operator burden (exclusive)" indicates a burden of a business operator when the vehicle 200 is exclusively used. A "business operator burden (transfer)" indicates a burden of a business operator when the vehicle 200 is used for transfer. On the other hand, a "user burden (exclusive)" indicates a burden of a user when the vehicle 200 is exclusively used. A "user burden (transfer)" indicates a burden of a user when the vehicle 200 is used for transfer. The charge model M is, for example, stored in the storage 380.

As shown in FIG. 6, in the "business operator burden (exclusive)," when the vehicle 200 is in the standby state at a stopover, a cost is generated according to a length of the standby state. As a result, in the "user burden (occupation)," a usage charge increases in accordance with the length of the standby state. On the other hand, in the case of transfer use, there is a vehicle allocation burden on a business operator side due to a transfer at a stopover. This vehicle allocation burden is passed onto a cost at the time of traveling in the "business operator burden (transfer)." As a result, the "user burden (transfer)" has a higher billing rate per unit time or unit distance at the time of traveling than the "user burden (exclusive)."

In other words, as a business operator, when the stay time of the user U at a stopover (a waiting time for the vehicle 200) is shorter than a predetermined time, the "business operator burden (exclusive)" may be lower than the "business operator burden (transfer)." As a result, a business operator can propose a charge model M in which the first usage charge is cheaper than the second usage charge when the estimated stay time at a stopover is shorter than a predetermined time to the user U. In the present embodiment, a "cost per unit time of the vehicle 200 in the case of exclusive use" of the first cost information 383 and a "cost per unit time of the vehicle 200 in the case of transfer use" of the second cost information 384 are set on the basis of such a charge model M. Then, the charge deriver 334 derives the first usage charge and the second usage charge on the basis of the charge model M. The charge deriver 334 outputs the derived first and second usage charges to the output 340.

The output 340 outputs information including the first usage charge and the second usage charge, which are derived by the charge deriver 334, to the terminal device 100 of the user U via the communicator 310 and the network NW. For example, the output 340 outputs the first usage charge and the second usage charge, which are derived on the basis of the same boarding condition, to the terminal device 100 of the user U in a comparable state.

Figure 7:
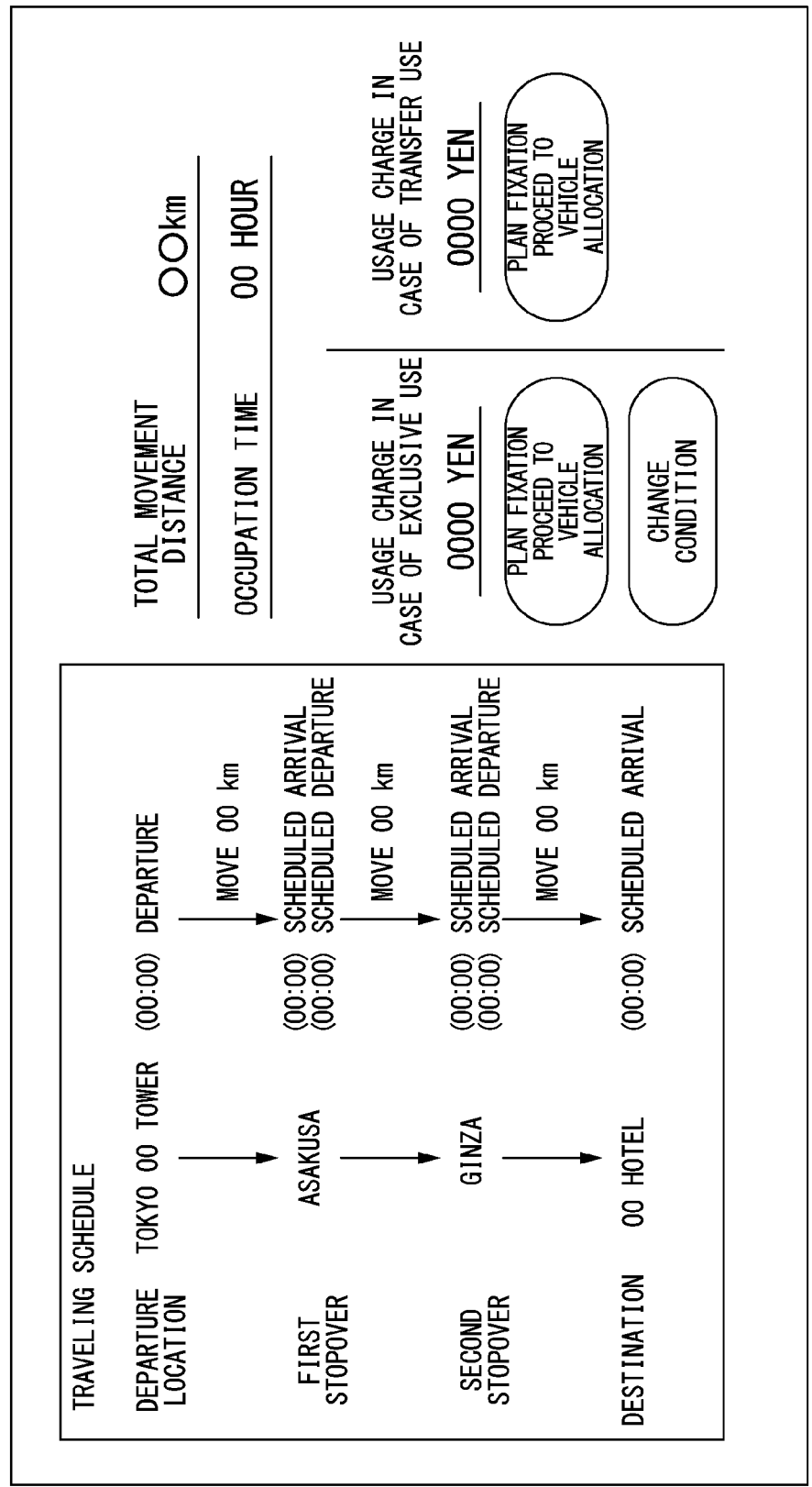
FIG. 7 is a diagram which shows an example of content of output information displayed on the terminal device 100.

FIG. 7 is a diagram which shows an example of content of output information output by the output 340 and displayed on the terminal device 100. As shown in FIG. 7, the output information includes, for example, a traveling schedule of the vehicle 200, a total movement distance, an occupation time, a usage charge in the case of exclusive use (the first usage charge), and a usage charge in the case of transfer use (the second usage charge). Note that the first usage charge and the second usage charge may also be displayed as reference charges that may differ from an actual cost in accordance with a road status, a congestion status of a parking lot, and the like.

In addition, the information processing device 300 can receive, for example, a change in the content (boarding condition) of a boarding request through the vehicle allocation support application after the content of the output information is displayed on the terminal device 100. For example, the information processing device 300 performs each type of processing described above on conditions when the stay time of the user U at a stopover is changed, and outputs the first usage charge when the stay time is changed to the terminal device 100 of the user U.

Figure 8:
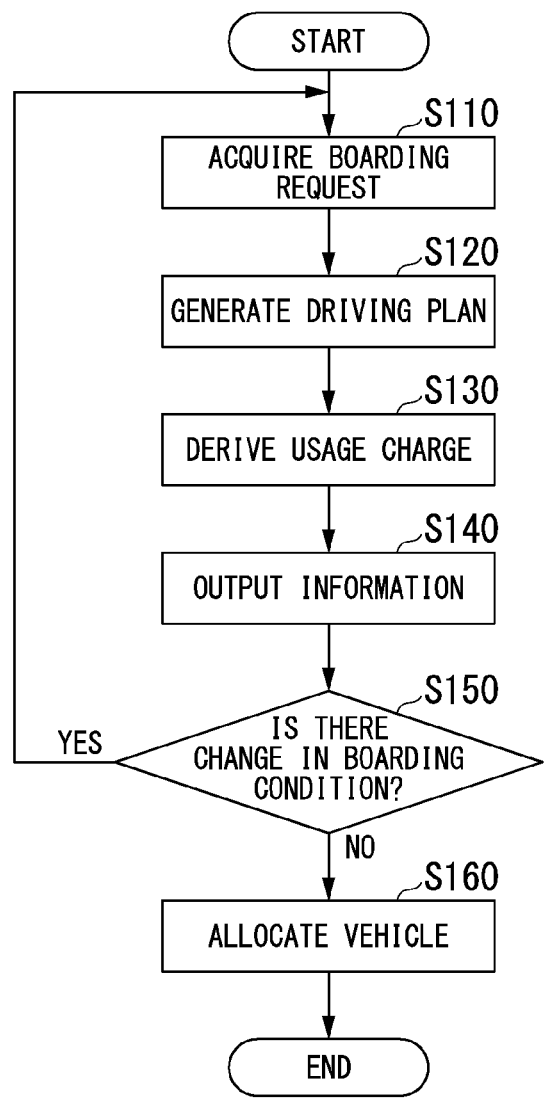
FIG. 8 is a flowchart which shows an example of a flow of processing of the information processing device 300.

Lastly, a processing flow of the information processing device 300 will be described. FIG. 8 is a flowchart which shows an example of a low of processing of the information processing device 300. As shown in FIG. 8, first, the acquirer 320 acquires a boarding request of the user U through the network NW and the communicator 310 (S110). Next, the driving plan generator 332 generates a driving plan of the vehicle 200 based on the boarding request of the user U acquired by the acquirer 320 (S120).

Next, the charge deriver 334 derives a first usage charge and a second usage charge on the basis of a driving plan generated by the driving plan generator 332 (S130). Next, the output 340 outputs information including the first usage charge and the second usage charge to present them to the user U (S140).

Next, the acquirer 320 determines whether there is a change in the content of the boarding request (S150). When there is a change in the content of the boarding request, the information processing device 300 repeats the processing from S110 to S150. On the other hand, when there is no change in the content of the boarding request, the information processing device 300 receives an input from the user who selects between the exclusive use or the transfer use, and arranges the vehicle 200 based on the received input (S160). Accordingly, the processing of this flowchart ends.

Figure 9:
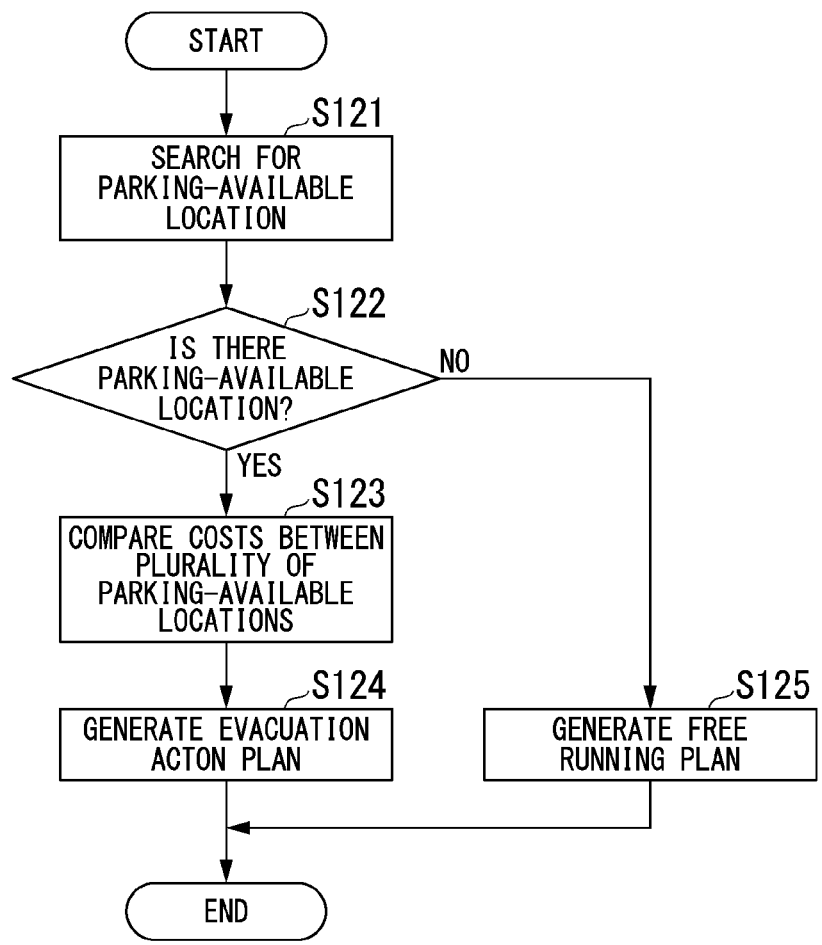
FIG. 9 is a flowchart which shows an example of a flow of processing for deriving a waiting plan.

FIG. 9 is a flowchart which shows an example of a flow of processing for deriving a waiting plan that is a part of the processing (S120) for deriving the driving plan of the vehicle 200. As shown in FIG. 9, first, the parking-available location searcher 422a searches for a parking-available location satisfying a predetermined condition (S121). Then, the parking-available location searcher 422a determines whether there are one or more parking-available locations satisfying a predetermined condition (S122).

Next, the parking-available location selector 422b compares between the plurality of parking-available locations satisfying a predetermined condition based on a predetermined priority when the plurality of parking-available locations satisfying a predetermined condition are detected (S123). Then, the parking-available location selector 422b selects one parking-available location for parking the vehicle 200. Next, the evacuation action plan generator 422c generates an evacuation action plan for evacuating the vehicle 200 to a parking-available location based on the parking-available location selected by the parking-available location selector 422b (S124). Note that, when only one parking-available location satisfying a predetermined condition is detected in the processing of S122, the processing of S123 is omitted and the processing of S124 is performed. On the other hand, when only one parking-available location satisfying a predetermined condition is detected in the processing of S122, the free running plan generator 424 generates a free running plan that causes the vehicle 200 to perform free running.

According to the information processing device 300 configured as described above, it is possible to improve the convenience. That is, the information processing device 300 of the present embodiment may derive the first usage charge reflecting the cost generated in the standby state of the vehicle 200 and output information including this first usage charge. According to such a configuration, useful information can be provided to a user who has a difficulty to determine whether to perform an exclusive use. For example, the user U can easily select an option for occupying the vehicle 200 by checking that the first usage charge is relatively cheap. In the case of exclusive use, even if the user U leaves the vehicle 200 at a stopover, the luggage of the user U can be loaded on the vehicle 200. As a result, when the user U has many pieces of luggage, the convenience of the user U is further increased. In addition, in the present embodiment, it is possible to monitor luggage remaining in the vehicle 200 using the vehicle compartment abnormality monitor 270. Accordingly, it is possible to give a high sense of security to the user U.

In the present embodiment, it is possible to derive the first usage charge according to the length of the stay time of a user at a stopover. As a result, the user can easily determine whether to perform the exclusive use in accordance with the length of the stay time at the stopover.

In the present embodiment, information including the first usage charge in the case of the exclusive use and the second usage charge in the case of the transfer use is output. As a result, the user U can easily determine whether to perform the exclusive use or the transfer use by comparing the first usage charge with the second usage charge.

[Modified Example: A Case of Designating Occupation Time or Final Destination and Borrowing]

Figure 10:
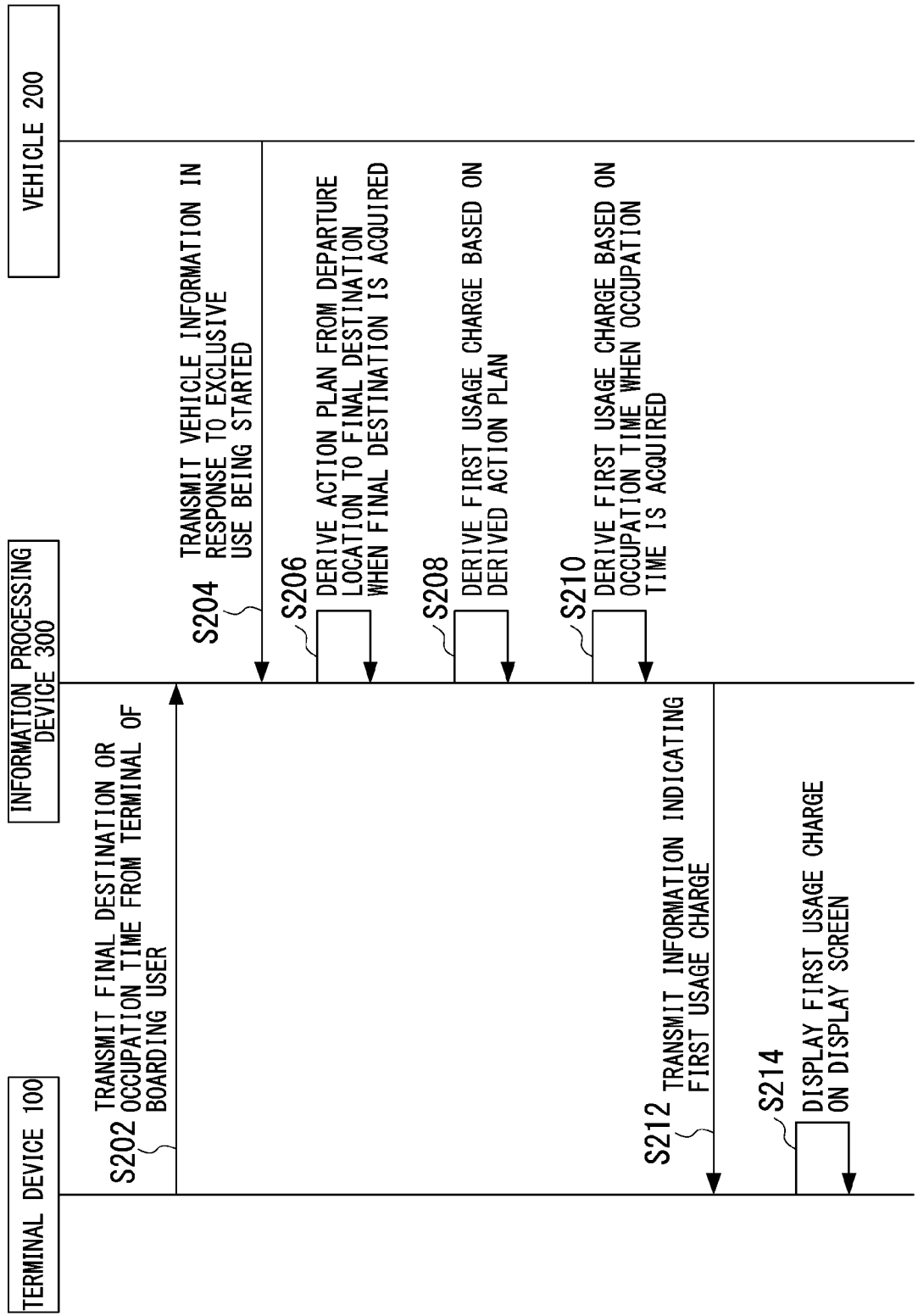
FIG. 10 is a diagram which shows an example of a sequence diagram when a boarding request is an occupation time or a final destination.

Note that, in the embodiment described above, a case in which the content of a boarding request indicates a departure location, a scheduled departure time of the departure location, one or more stopovers, the estimated stay time at each stopover, and a destination has been described, but the present invention is not limited thereto. The content of a boarding request may also be an occupation time or a final destination of the vehicle 200. FIG. 10 is a diagram which shows an example of a sequence diagram when a boarding request is an occupation time or a final destination. The terminal device 100 transmits a boarding request indicating at least one of the occupation time or the final destination of the vehicle 200 designated by the user U via the network NW to the information processing device 300 (S202). The user U transmits, for example, the boarding request to the vehicle 200 at a timing (before or after boarding) at which the user enters the vehicle 200. The vehicle 200 transmits information (hereinafter, vehicle information) in which information that can identify the vehicle 200 and a current position of the vehicle 200 are associated with each other to the information processing device 300 in response to the user U entering the vehicle 200 (S204).

The deriver 330 derives the action plan of the vehicle 200 from the departure location to the final destination on the basis of vehicle information acquired from the vehicle 200 and a final destination when only the final destination is indicated in the boarding request acquired from the terminal device 100 (S206). Next, the deriver 330 derives the first usage charge on the basis of the derived action plan (S208). The deriver 330 derives the first usage charge on the basis of the vehicle information acquired from the vehicle 200 and an occupation time when only the occupation time is indicated in the boarding request acquired from the terminal device 100 (S210). Note that, when the boarding request includes a final destination and an occupation time, any one of the first usage charges derived in S208 and S210 may be selected, and a value derived on the basis of the two first usage charges (for example, an average value or a median value of the two first usage charges) may be derived as the first usage charge.

The communicator 310 transmits information indicating the first usage charge derived by the deriver 330 to the terminal device 100 via the network NW (S212). The terminal device 100 displays information indicating the first usage charge received from the information processing device 300 using the vehicle allocation support application on a display screen (S214). Note that, when the first usage charge is equal to or greater than a predetermined amount, the information processing device 300 may request a payment of the first usage charge to the user U (the terminal device 100) before arriving at a final destination. In addition, the user U may cancel an exclusive use using the vehicle allocation support application after checking the first usage charge.

According to the information processing device 300 configured as described above, the user U can exclusively use the vehicle 200 while saving time and effort for performing a boarding request in advance.

[Additional Request]

Figure 11:
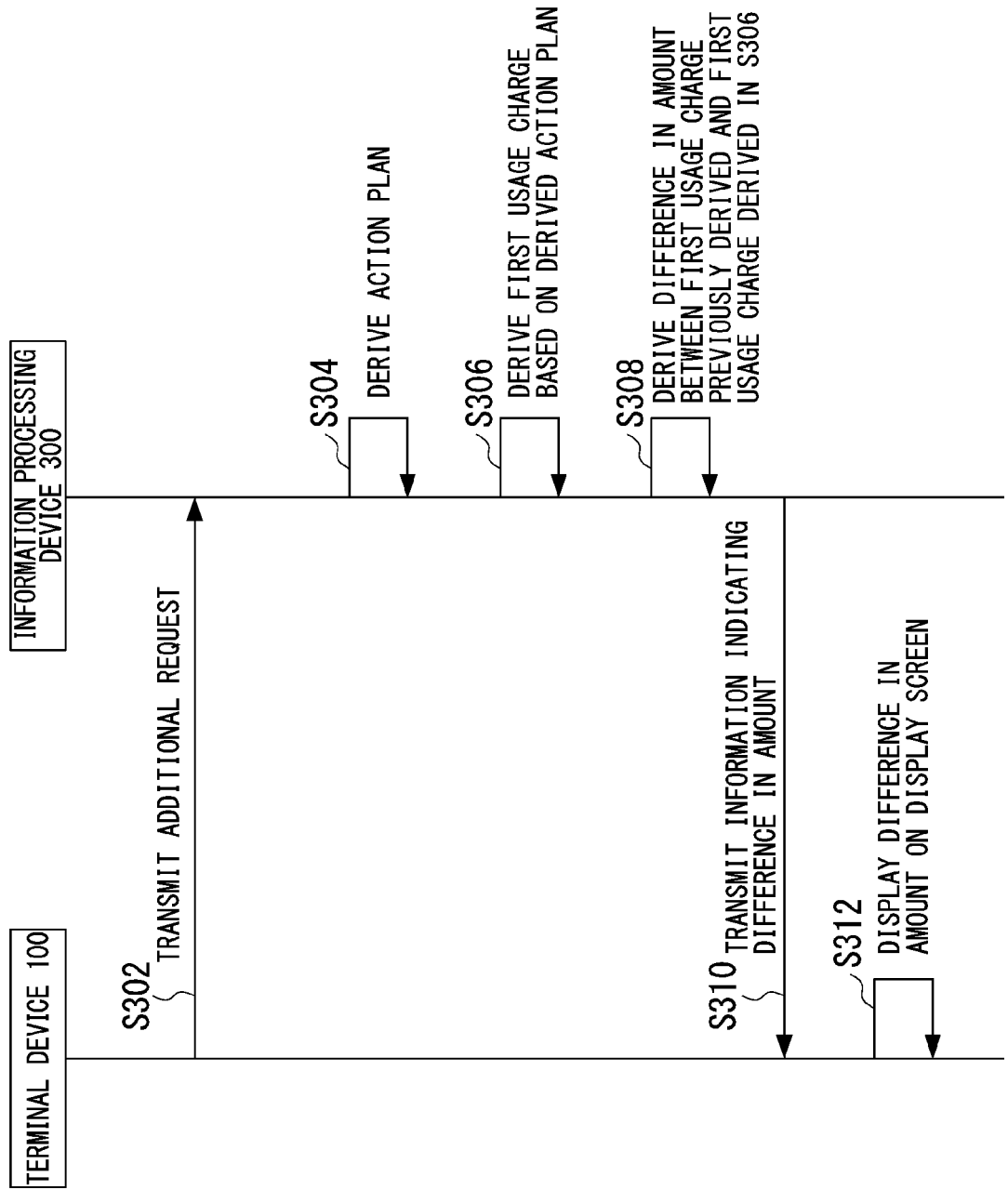
FIG. 11 is a diagram which shows an example of a sequence until a difference in amount accompanied by an additional request is presented to a user U.

In addition, the information processing device 300 described above may derive an action plan and a first usage charge, derive a difference in amount from an initial charge, and present it to the user U in consideration of a stopover newly added according to an additional request. FIG. 11 is a diagram which shows an example of a sequence until a difference in amount accompanied by an additional request is presented to the user U. The terminal device 100 transmits an additional request indicating a new stopover added by the user U using the vehicle allocation support application to the information processing device 300 via the network NW (S302). Note that the HMI included by the terminal device 100 is an example of the "operation receptor."

Next, the deriver 330 derives the action plan of the vehicle 200 from a position before heading to a new stopover (for example, a departure location, a re-boarding location, a parking position of the vehicle 200 in the standby state, or a current position of the vehicle 200 during traveling in the unmanned state) to the new stopover on the basis of a new stopover indicated in the additional request acquired by the terminal device 100 (S304). Then, the deriver 330 derives a new first usage charge on the basis of the derived action plan (S306). Then, the deriver 330 derives a difference in amount between the first usage charge which is previously derived and the new first usage charge derived by the processing of S306 (S308). Next, the communicator 310 transmits information indicating the difference in amount derived by the deriver 330 to the terminal device 100 via the network NW (S310). The terminal device 100 displays the difference in amount between the first usage charge which is previously derived and the first usage charge which is newly derived in consideration of the new stopover, which is received from the information processing device 300 using the vehicle allocation support application, on a display screen (S312).

According to the information processing device 300 configured as described above, it is possible to flexibly cope with a change in the schedule of the user U.

[Case of Carrying Luggage to Destination while Waiting]

Figure 12:
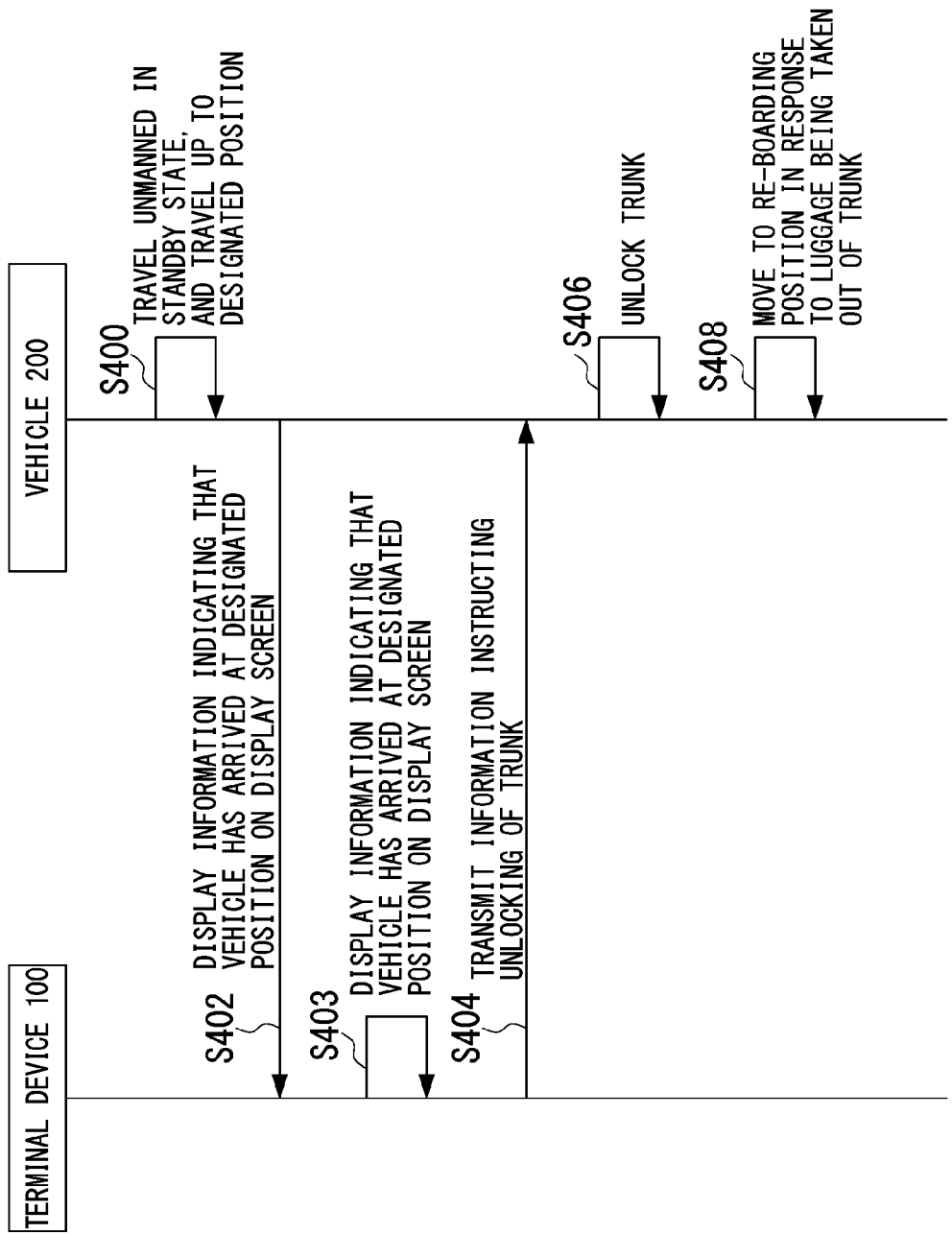
FIG. 12 is a diagram which shows an example of a sequence when a vehicle travels in an unmanned state and carries luggage of the user U in a standby state.

In addition, in the above description, in the standby state, a case of parking at a parking lot or traveling in the unmanned state has been described, but the present invention is not limited thereto. For example, in the standby state, the vehicle 200 may carry luggage that the user U deposits in the compartment of the vehicle 200 (for example, the vehicle compartment or trunk) to a designated position (for example, a final destination (hotel): hereinafter, a designated position) by traveling in the unmanned state, and return to a re-boarding position. FIG. 12 is a diagram which shows an example of a sequence when a vehicle travels in the unmanned state and carries the luggage of the user U in the standby state. The vehicle 200 travels in the unmanned state to a designated position in the standby state (S400). The designated position may be, for example, a final destination, or a position separately designated by the user U. The vehicle 200 transmits information indicating that it has arrived at the designated position to the terminal device 100 via the network NW (S402).

Next, the terminal device 100 displays the information indicating that the vehicle 200 has arrived at the designated position, which is received from the vehicle 200, on a display screen using the vehicle allocation support application (S403). The information indicating that the vehicle has arrived at the designated position may be an image indicating the designated position imaged by a camera mounted on the vehicle 200, information indicating a current position of the vehicle 200, and may also be information indicating the designated position. Next, the terminal device 100 transmits information (hereinafter, an unlocking signal) that the user U instructs an unlocking of the trunk using the vehicle allocation support application to the vehicle 200 (S404).

Next, the vehicle 200 unlocks the trunk on the basis of an unlocking signal received from the terminal device 100 (S406). The vehicle 200 moves to the re-boarding position in accordance with luggage being taken out of the trunk (S408). In the vehicle 200, for example, a pressure sensor is provided in the trunk or the vehicle compartment and can detect a presence or absence of a passenger or the presence or absence of luggage.

According to the information processing device 300 configured as described above, it is possible to improve the convenience of the user U. Note that the vehicle 200 transmits information indicating that the luggage is taken out of the vehicle 200 to the terminal device 100, and the user U may transmit information (hereinafter, a locking signal) that the user U instructs locking of the trunk in response to the terminal device 100 receiving the information to the vehicle 200. In this case, the vehicle 200 locks the trunk on the basis of the locking signal received from the terminal device 100. As a result, it is possible to suppress others except the user U from using the trunk. In addition, the user U may transmit an air conditioning control signal for controlling air conditioning of the vehicle 200 to the vehicle 200 in the standby state using the terminal device 100, and the vehicle 200 may control air conditioning on the basis of the received air conditioning control signal. As a result, the vehicle 200 can set an environment in the vehicle compartment to an environment desired by the user U before the user U enters the vehicle again.

[Low Price Presentation Method]

In addition, in the above description, a case in which the information processing device 300 derives and outputs the first usage charge based on various conditions input by the user U has been described, but the present invention is not limited thereto. For example, the information processing device 300 may be configured to derive a condition in which the first usage charge is cheaper than the second usage charge and to present the derived condition to the user U. Specifically, the deriver 330 varies the stay time acquired as a boarding request, and identifies the stay time when the first usage charge is cheaper than the second usage charge. The communicator 310 transmits information indicating the stay time derived by the deriver 330, information indicating the first usage charge in the case of the stay time, and information indicating the second usage charge to the terminal device 100.

The terminal device 100 displays the stay time transmitted by the information processing device 300, the first usage charge, and the second usage charge on a display unit. In this case, the user U can ascertain that the vehicle 200 is used by the exclusive use cheaper than a transfer if the stay time is the time displayed on the terminal device 100. Therefore, according to the information processing device 300 configured as described above, it is possible to improve the convenience of the user U.

[First Usage Charge Prediction]

In addition, in the above description, a case in which the information processing device 300 calculates and outputs the first usage charge has been described, but the present invention is not limited thereto. For example, a case of parking at a parking lot in the standby state is assumed, and, even though the first usage charge is derived by the deriver 330, the vehicle 200 cannot park at the parking lot when the assumed parking lot is full. In this case, the vehicle 200 travels unmanned in the standby state. Therefore, the first usage charge initially presented to a user U may be different from the first usage charge accompanied by an actual traveling of the vehicle 200 in some cases.

The deriver 330 derives, for example, an action plan which can be taken by the vehicle 200 in the standby state, derives a first usage charge for each derived action plan, and outputs it. As a result, the user U can use the vehicle 200 after understanding the possibility of change in the first usage charge.

[When Another Vehicle 200 is Allocated at the Time of Re-Boarding]

In addition, in the above description, a case in which the vehicle 200 which the user U boards at the time of the exclusive use is a single vehicle has been described, but the present invention is not limited thereto. The vehicle 200 which the user U boards at the time of the exclusive use may be a plurality of vehicles. For example, in the standby state, when a movement of a long distance between a stopover at which the user U exits the vehicle to a re-boarding position is performed by a method other than the movement by the vehicle 200, the vehicle 200 is required to travel the long distance. In this case, it is more efficient to allow the user U to board another vehicle 200 traveling at the re-boarding position.

Figure 13:
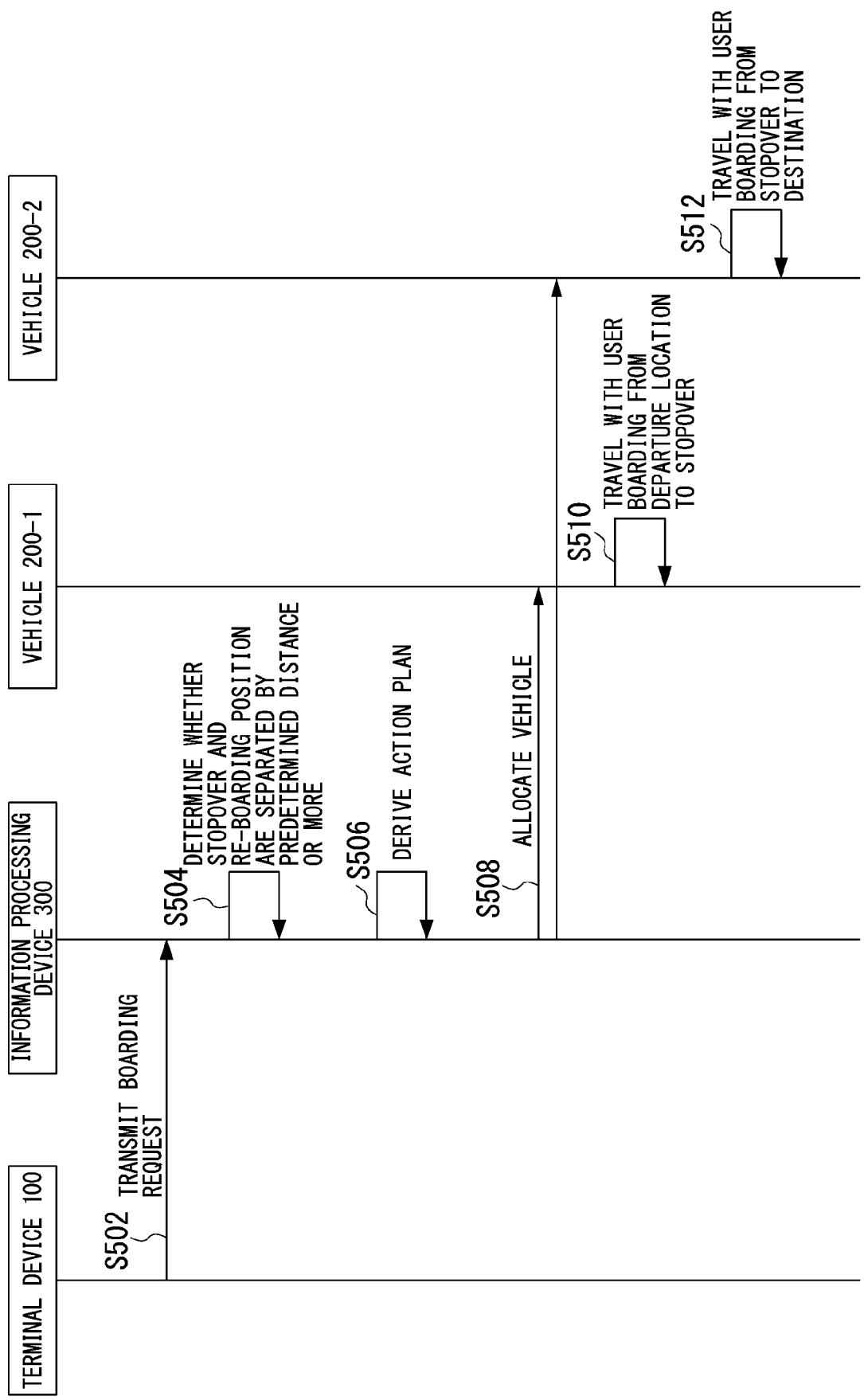
FIG. 13 is a diagram which shows an example of a sequence of the vehicle allocation support system 1 when another vehicle 200 is allocated.

FIG. 13 is a diagram which shows an example of a sequence of the vehicle allocation support system 1 when another vehicle 200 is allocated. The terminal device 100 transmits a boarding request to the information processing device 300 via the network NW by the user U using the vehicle allocation support application (S502). The information processing device 300 determines whether the stopover and the re-boarding position are separated by a predetermined distance (for example, several [km]) or more on the basis of the boarding request received from the terminal device 100 (S504). The deriver 330 derives the action plan of the vehicle 200 on the basis of the acquired boarding request (S506). Specifically, when the stopover and the re-boarding position are separated by a predetermined distance or more, the deriver 330 derives the action plan of a first vehicle 200 (hereinafter, a vehicle 200-1) which the user U boards from the departure location to the stopover and derives an action plan of a second vehicle 200 (hereinafter, a vehicle 200-2) which the user U boards from the re-boarding position to the final destination.

Next, the communicator 310 arranges the vehicle 200-1 and the vehicle 200-2 on the basis of each action plan derived by the deriver 330 (S508). The vehicle 200-1 moves to the departure location and travels with the user U boarding from the departure location to the stopover on the basis of a vehicle allocation request of the information processing device 300 (S510). The vehicle 200-2 moves to the re-boarding position and travels with the user U boarding from the re-boarding position to the final destination on the basis of the vehicle allocation request of the information processing device 300 (S512). Note that a case in which the user U moves from the departure location to the final destination using two vehicles 200 has been described in the above description, but the present invention is not limited thereto. The information processing device 300 may cause the user U to move to the final destination using, for example, two or more vehicles 200.

Note that, as described above, when the user U deposits luggage in the vehicle 200, it is difficult to use a plurality of vehicles 200 in this manner, and thus the deriver 330 may set the first usage charge to be high on the basis of a usage status of the vehicle 200 (for example, whether the trunk can be used) and a use method of the user U (for example, whether to deposit luggage in the vehicle 200).

According to the information processing device 300 configured as described above, a business operator can help the user U to move to the final destination more efficiently.

[Charge and Cost]

Moreover, the first usage charge includes an index that can be converted into a wisdom cash value at the time of payment. This index includes, for example, points, virtual currency, market values that can vary depending on a payment timing, and the like.

[Substitution of Terminal Device 100]

In addition, a case in which the terminal device 100 of the user U transmits a boarding request and the like has been described as above, but the present invention is not limited thereto. The user U may also transmit a boarding request and the like using, for example, an HMI (for example, an HMI 232 included in the navigation device 230) included in the vehicle 200 instead of the terminal device 100.

As described above, although modes for implementing the present invention has been described using the embodiments, but the present invention is not limited to such embodiments at all, and various changes and substitutions can be made within a range not departing from the gist of the present invention.

For example, the information processing device 300 may be mounted on the vehicle 200.

The invention claimed is:

1. An information processing system comprising:
a hardware processor executing software, hardware including circuitry, or a cooperation of the software and the hardware configured to operate as:
an acquirer configured to acquire, from a terminal device, via a wireless communication network, a boarding request;
a deriver configured to derive, when an action schedule of an automatic driving vehicle includes a standby state based on the boarding request acquired by the acquirer, a first usage charge of the automatic driving vehicle reflecting a cost generated in a traveling state in which the automatic driving vehicle carries a user and travels and a cost generated in the standby state; and
an output configured to output, via the wireless communication network on a display of the terminal device, information including the first usage charge derived by the deriver, wherein
based on receipt of a request, from the terminal device, for use of the automatic driving vehicle in response to the information output on the display, a usage of the automatic driving vehicle is allocated for the user, wherein
the standby state includes traveling in an unmanned state,
the acquirer acquires information related to an estimated stay time of the user at a stopover between a departure location and a destination,
the deriver generates, based on the estimated stay time of the user at the stopover and an additional request for adding a stopover indicated by the boarding request acquired by the acquirer, an action plan of the automatic driving vehicle that moves in the unmanned state to the stopover indicated by the additional request, and derives a cost generated in the standby state based on a generated action plan, and
an automatic driving controller of the automatic driving vehicle that controls movement of the automatic driving vehicle according to the action plan.

2. The information processing system according to claim 1,
the deriver derives at least the cost generated in the standby state on the basis of the estimated stay time of the user at the stopover acquired by the acquirer.

3. The information processing system according to claim 2,
wherein the deriver generates the action plan of the automatic driving vehicle in the standby state on the basis of the estimated stay time of the user at the stopover between the departure location and the destination, and derives the cost generated in the standby state on the basis of the generated action plan.

4. The information processing system according to claim 3,
wherein, when the action plan includes a standby state starting from the stopover, the deriver generates a plurality of action plans which are taken by the automatic driving vehicle in the standby state and derives a cost generated in an action plan for each of the action plans, and
the output outputs information further including a cost for each of the action plans derived by the deriver.

5. The information processing system according to claim 4,
wherein the plurality of action plans which are taken by the automatic driving vehicle include a plan in which a plurality of different vehicles move through different routes, and at least one vehicle joins a user and is boarded again.

6. The information processing system according to claim 3,
wherein the deriver searches for at least a parking-available location satisfying a predetermined condition based on the estimated stay time of the user at the stopover between the departure location and the destination and map information indicating parking-available locations in the vicinity of the stopover, and derives the first usage charge reflecting a cost generated by using the parking-available location when the parking-available location satisfying the predetermined condition is a paid location.

7. The information processing system according to claim 6,
wherein the deriver generates the action plan in which the automatic driving vehicle keeps traveling in the unmanned state when no parking-available locations satisfying the predetermined condition are detected.

8. The information processing system according to claim 7,
wherein the deriver derives the first usage charge on the basis of a third usage charge generated by using the parking-available location at the time of traveling in the unmanned state.

9. The information processing system according to claim 1, wherein the hardware processor executing software, the hardware including circuitry, or the cooperation of the software and the hardware are further configured to operate as:
an operation receptor configured to receive an operation of the user; and
a transmitter configured to transmit at least one of a locking signal that locks a compartment of the automatic driving vehicle from outside of the automatic driving vehicle, an unlocking signal that unlocks the compartment, and an air conditioning control signal that controls air conditioning of the automatic driving vehicle to the automatic driving vehicle based on the operation of the user received by the operation receptor in the standby state.

10. The information processing system according to claim 1,
wherein the deriver derives a second usage charge when transferring to another automatic driving vehicle at the stopover, and
the output outputs information including the second usage charge derived by the deriver.

11. The information processing system according to claim 10,
wherein the output outputs a condition of the boarding request when the first usage charge calculated by the deriver is lower than the second usage charge.

12. The information processing system according to claim 1,
wherein the acquirer is capable of acquiring a change request indicating a change in the boarding request while the automatic driving vehicle is traveling based on the boarding request, and
the deriver derives a difference in amount from the first usage charge that is caused by a change from the boarding request on the basis of the change request acquired by the acquirer.

13. The information processing system according to claim 1,
wherein the deriver derives the first usage charge further on the basis of a usage status of the automatic driving vehicle.

14. An information processing system comprising:
a hardware processor executing software, hardware including circuitry, or a cooperation of the software and the hardware configured to operate as:
an acquirer configured to acquire, from a terminal device via a wireless communication network, a boarding request including an estimated stay time at a stopover between a departure location and a destination;
a deriver configured to derive a first usage charge when an automatic driving vehicle is occupied from the departure location to the destination and a second usage charge when transferring to another automatic driving vehicle at the stopover on the basis of the boarding request acquired by the acquirer; and
an output configured to output, via the wireless communication network and on a display of the terminal device, information including the first usage charge and the second usage charge derived by the deriver;
based on receipt of a first request for use of the automatic driving vehicle in response to the first usage charge, use of the automatic driving vehicle is allocated for a user of the terminal device, wherein the first request is received from the terminal device via the wireless communication network, wherein
the acquirer acquires information related to the estimated stay time of the user at the stopover between the departure location and the destination, and
the deriver generates, based on the estimated stay time of the user at the stopover and an additional request for adding a stopover indicated by the boarding request acquired by the acquirer, an action plan of the automatic driving vehicle that moves in an unmanned state to the stopover indicated by the additional request, and derives a cost generated in a standby state based on a generated action plan, wherein the standby state includes traveling in the unmanned state, wherein an automatic driving controller of the automatic driving vehicle receives the action plan from the deriver and controls the automatic driving vehicle such that the automatic driving vehicle moves according to the action plan.

15. An information processing method comprising:
by a computer
acquiring a boarding request that causes a standby state, wherein the boarding request is acquired from a terminal device via a wireless communications network;
deriving a usage charge of an automatic driving vehicle reflecting a cost generated in a traveling state in which the automatic driving vehicle carries a user and travels and a cost generated in the standby state based on the acquired boarding request;
outputting information including the derived usage charge, wherein the information is output, via the wireless communications network, on a display of the terminal device; and
based on receipt of a request, from the terminal device for use of the automatic driving vehicle in response to the information including the usage charge, allocating a usage of the automatic driving vehicle for the user,
the standby state includes traveling in an unmanned state,
the information processing method further comprising:
by the computer:
acquiring information related to an estimated stay time of the user at a stopover between a departure location and a destination,
generating, based on the estimated stay time of the user at the stopover and an additional request for adding a stopover indicated by the boarding request, an action plan of the automatic driving vehicle that moves in the unmanned state to the stopover indicated by the additional request, and deriving a cost generated in the standby state based on a generated action plan, and
based on the action plan, causing an automatic driving controller of the automatic driving vehicle to control a movement of the automatic driving vehicle in accordance with the action plan.

16. A program which causes a computer to:
acquire a boarding request which causes a standby state, wherein the boarding request is acquired from a terminal device via a wireless communications network;
derive a usage charge of an automatic driving vehicle reflecting a cost generated in a traveling state in which the automatic driving vehicle carries a user and travels and a cost generated in the standby state based on the acquired boarding request;
output information including the derived usage charge, wherein the information is output, via the wireless communications network, on a display of the terminal device; and
based on receipt of a request, from the terminal device for use of the automatic driving vehicle in response to the information including the usage charge, allocate a usage of the automatic driving vehicle for the user,
the standby state includes traveling in an unmanned state,
wherein the program further causes the computer to:
acquire information related to an estimated stay time of the user at a stopover between a departure location and a destination,
generate, based on the estimated stay time of the user at the stopover and an additional request for adding a stopover indicated by the boarding request, an action plan of the automatic driving vehicle that moves in the unmanned state to the stopover indicated by the additional request, and derive a cost generated in the standby state based on a generated action plan, and facilitate movement control of the automatic driving vehicle, via an automatic driving controller, based on the generated action plan.

* * * * *